(12) United States Patent
Monnerat et al.

(10) Patent No.: US 11,706,401 B2
(45) Date of Patent: *Jul. 18, 2023

(54) METHODS AND SYSTEMS FOR DISPLAYING CONTENT

(71) Applicant: Comcast Cable Communications, LLC, Philadelphia, PA (US)

(72) Inventors: Edward David Monnerat, Highlands Ranch, CO (US); Jonathan Alan Leech, Denver, CO (US); Nicholas Adam Pinckernell, Littleton, CO (US); Mehul Patel, Centennial, CO (US); Jasbir Rajpal, Parker, CO (US); Garey Hoffman, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,530

(22) Filed: Sep. 27, 2021

(65) Prior Publication Data

US 2022/0264078 A1 Aug. 18, 2022

Related U.S. Application Data

(63) Continuation of application No. 14/996,888, filed on Jan. 15, 2016, now Pat. No. 11,166,008.

(51) Int. Cl.
*H04N 13/00* (2018.01)
*H04N 13/351* (2018.01)
*H04N 13/368* (2018.01)
*H04N 13/302* (2018.01)
*H04N 13/30* (2018.01)

(52) U.S. Cl.
CPC ......... *H04N 13/351* (2018.05); *H04N 13/302* (2018.05); *H04N 13/368* (2018.05); *H04N 2013/40* (2018.05)

(58) Field of Classification Search
CPC .. H04N 13/351; H04N 13/368; H04N 13/302; H04N 2013/40
See application file for complete search history.

(56) References Cited

U.S. PATENT DOCUMENTS

| | | | |
|---|---|---|---|
| 6,304,763 B1 | 10/2001 | Jahagirdar et al. | |
| 6,643,124 B1 | 11/2003 | Wilk | |
| 9,342,143 B1* | 5/2016 | Rhodes | G06F 1/1686 |
| 2005/0195978 A1 | 9/2005 | Babic et al. | |
| 2009/0273721 A1* | 11/2009 | Dhuey | G02B 6/06 |
| | | | 348/739 |
| 2010/0302136 A1* | 12/2010 | Arcuri | G02B 30/50 |
| | | | 359/464 |

(Continued)

*Primary Examiner* — Zhihan Zhou
(74) *Attorney, Agent, or Firm* — Ballard Spahr LLP

(57) ABSTRACT

Disclosed are methods and systems for displaying content. In an aspect, a plurality of content items can be displayed on one user device according to user preference. An example method can comprise positioning a first set of pixels associated with a user device so that first content displayed via the first set of pixels can be viewable in a first viewing location. A second set of pixels associated with the user device can be positioned so that second content displayed via the second set of pixels can be viewable in a second viewing location. The second content can be different from the first content.

24 Claims, 16 Drawing Sheets

(56) References Cited

U.S. PATENT DOCUMENTS

| | | | |
|---|---|---|---|
| 2012/0194507 A1* | 8/2012 | Lee | G06F 3/04815 |
| | | | 345/419 |
| 2013/0002695 A1* | 1/2013 | Kohno | H04N 21/4223 |
| | | | 345/581 |
| 2013/0335538 A1* | 12/2013 | Shestak | H04N 13/31 |
| | | | 348/54 |
| 2015/0062007 A1* | 3/2015 | Itoh | H04N 13/305 |
| | | | 345/156 |
| 2016/0210100 A1* | 7/2016 | Ng | G06F 3/1423 |
| 2016/0364087 A1* | 12/2016 | Thompson | H04N 13/351 |

\* cited by examiner

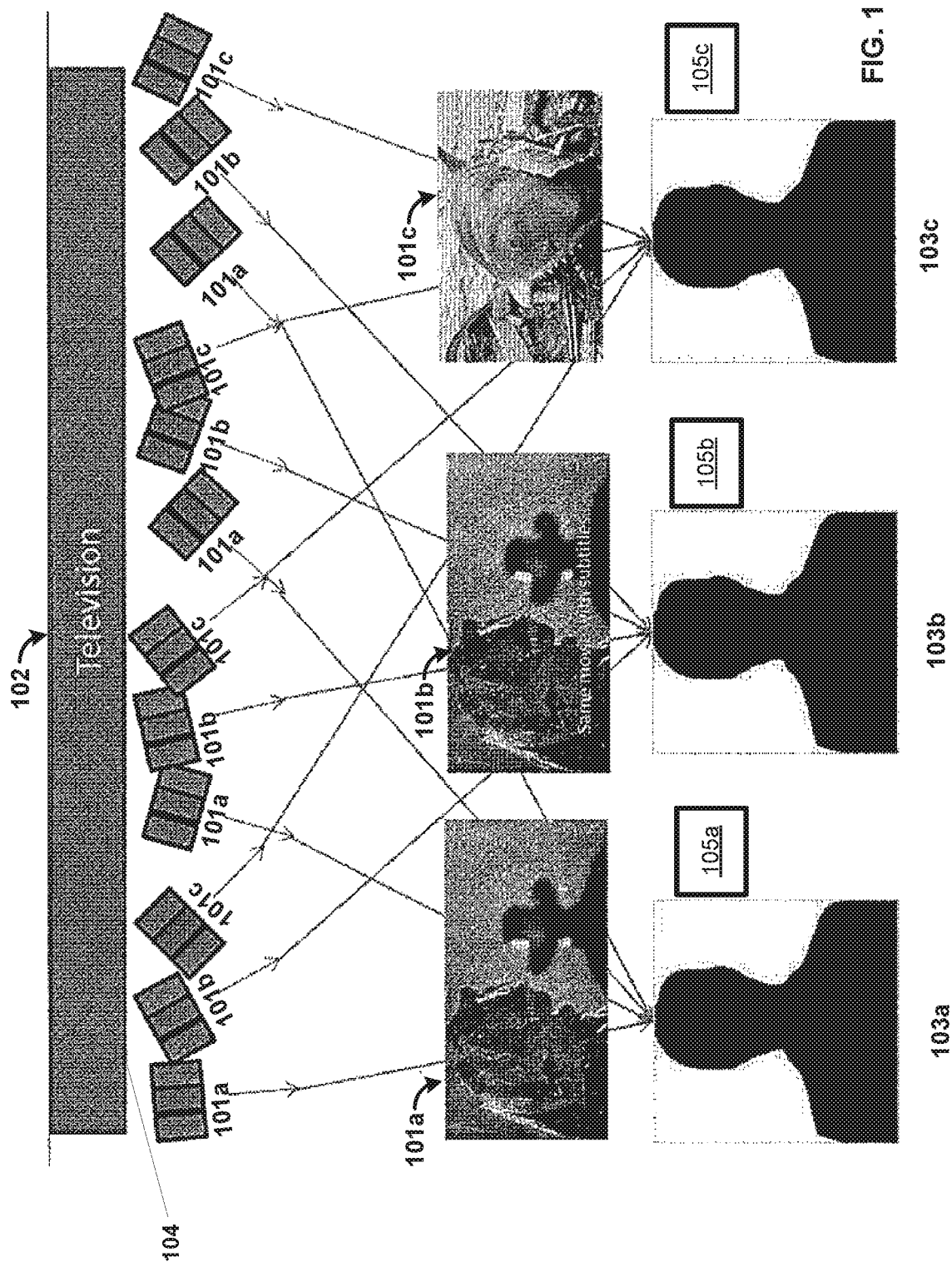

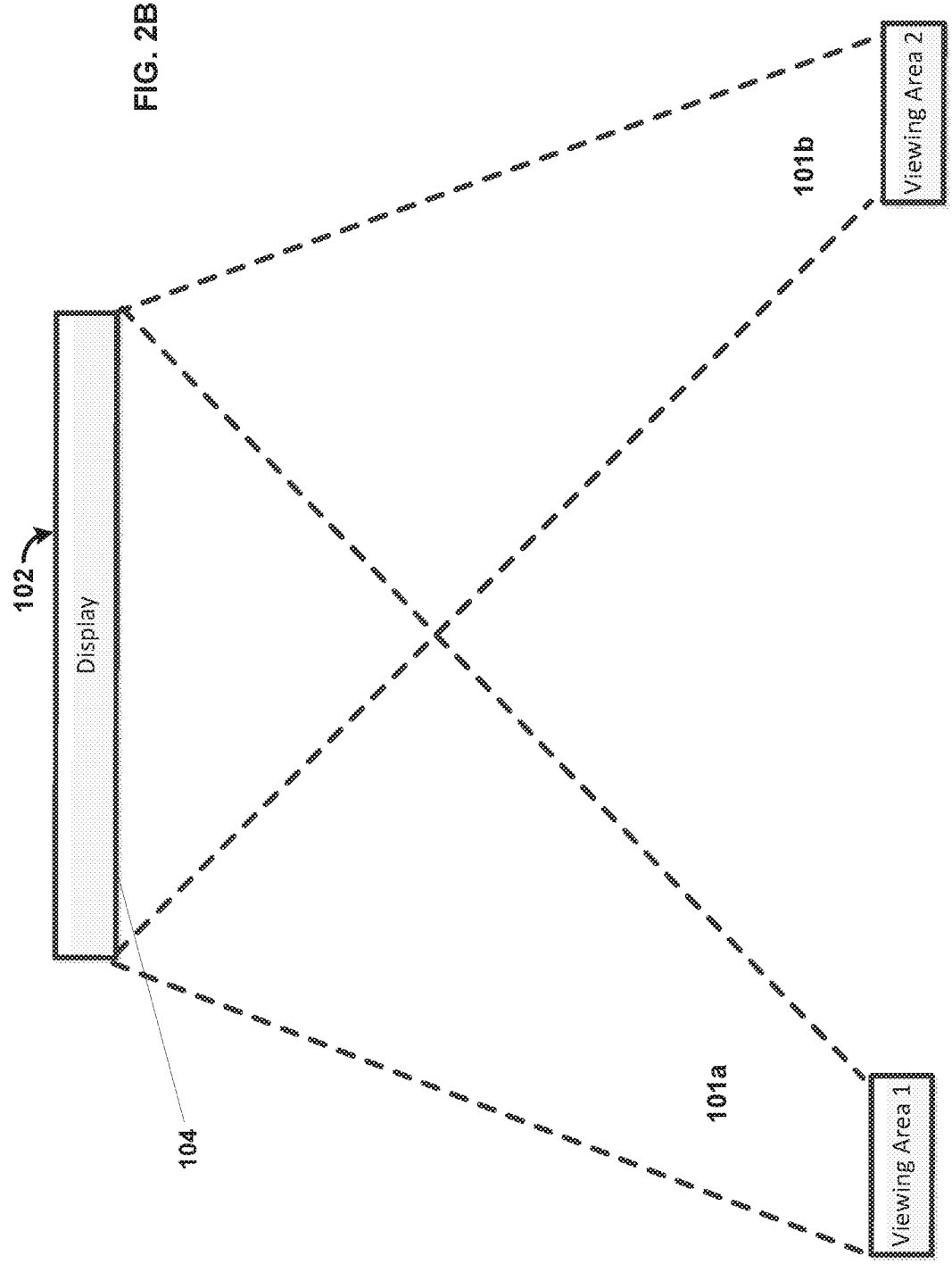

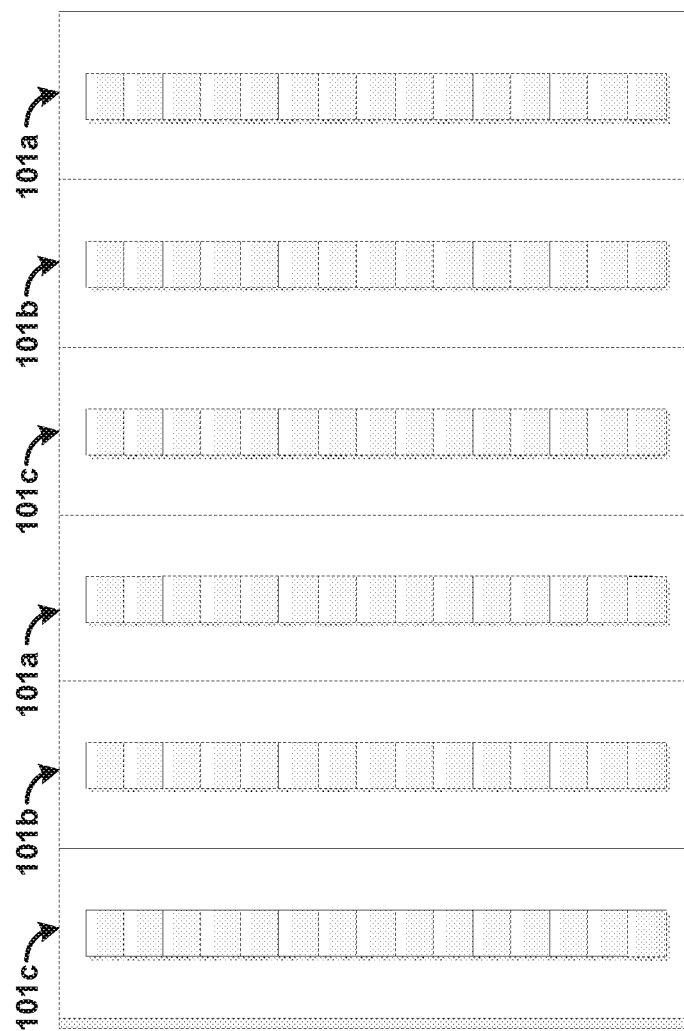

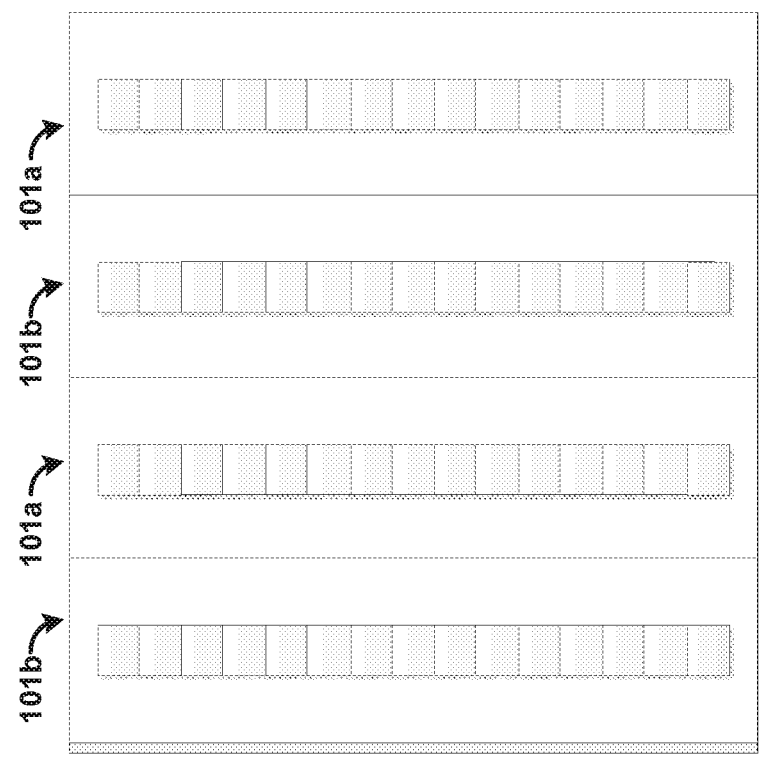

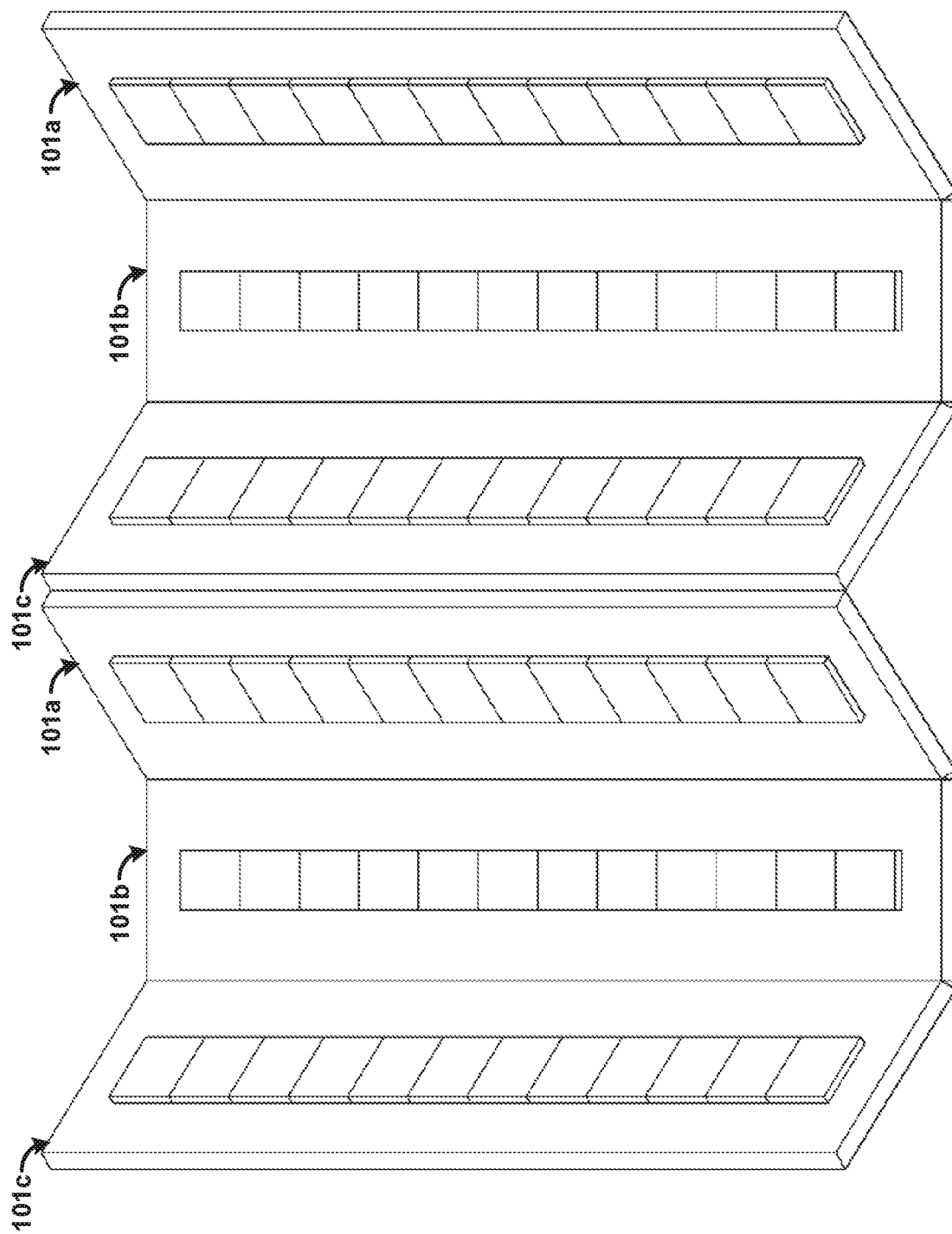

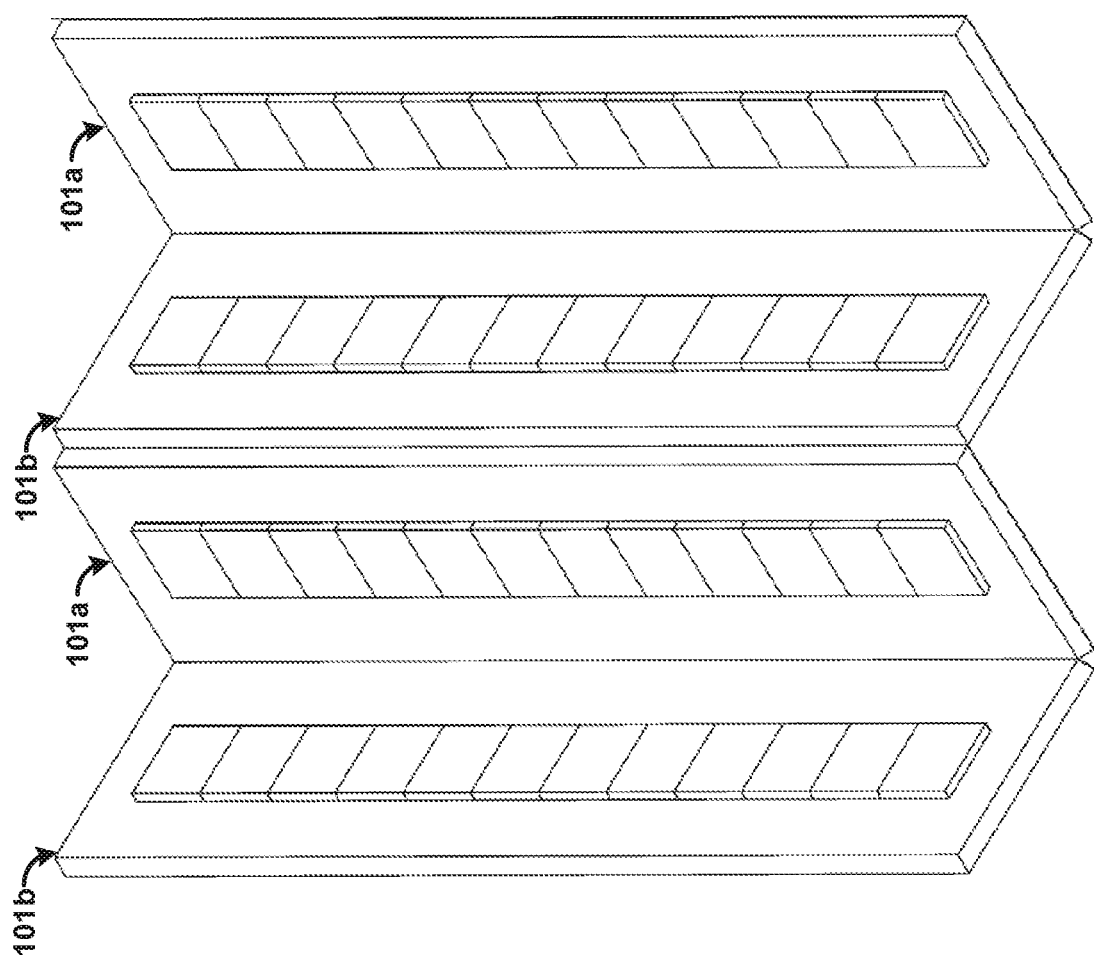

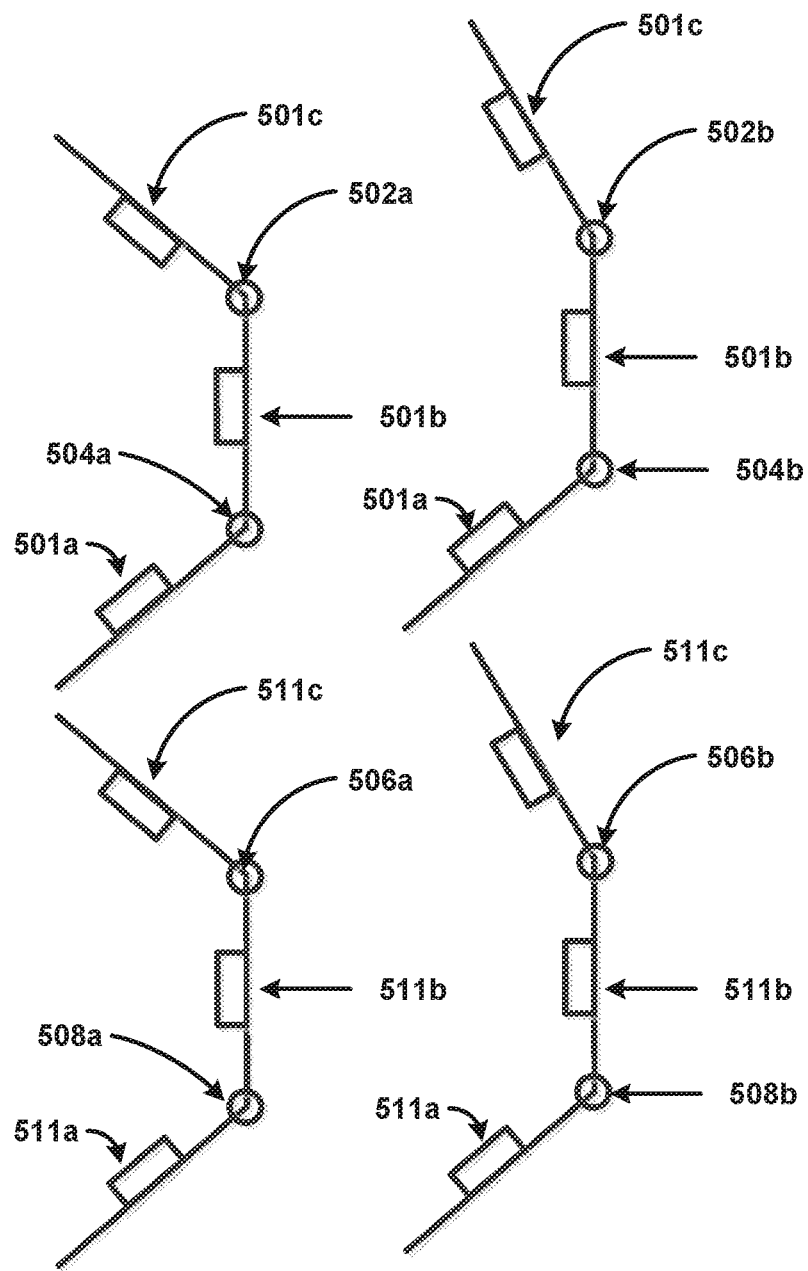

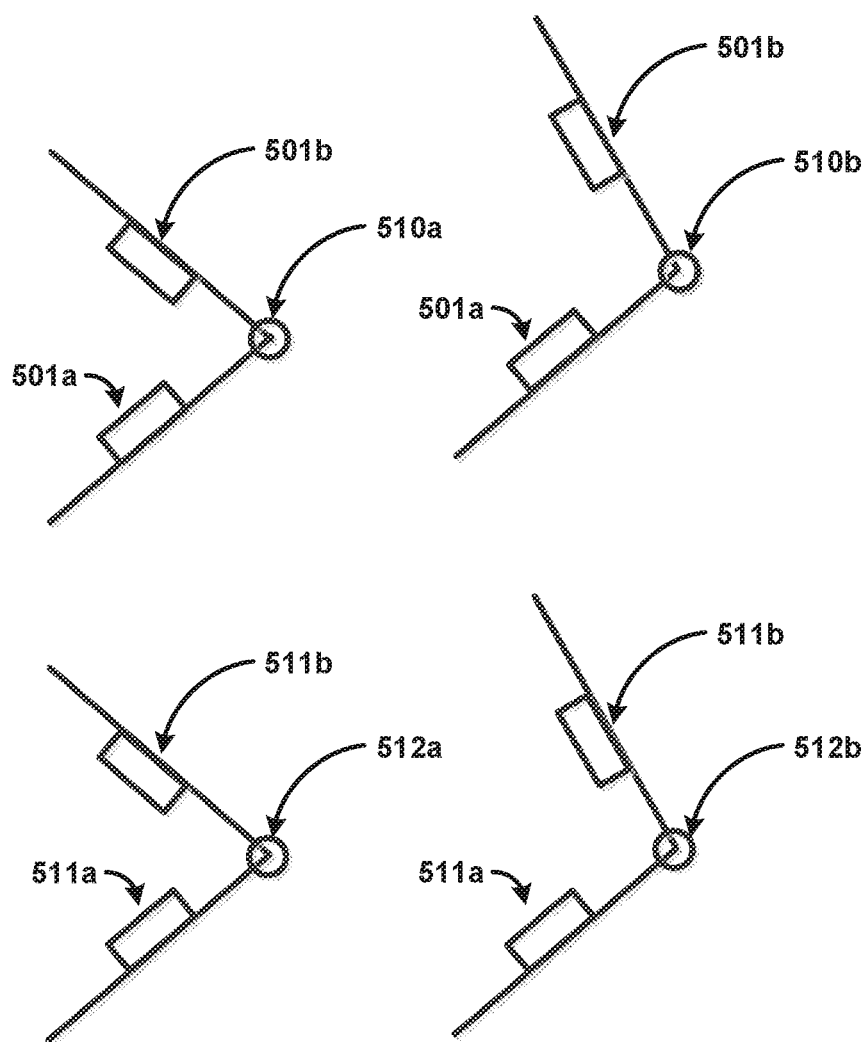

METHODS AND SYSTEMS FOR DISPLAYING CONTENT

CROSS REFERENCE TO RELATED APPLICATION

This application is a continuation of U.S. application Ser. No. 14/996,888, filed Jan. 15, 2016, which is herein incorporated by reference in its entirety.

BACKGROUND

Often, multiple viewers are in the presence of a single display device. If there is no consensus from the multiple viewers on the content displayed on the single display device, then at least a portion of the multiple viewers may be dissatisfied with the content displayed on the single display device. These and other shortcomings are addressed in the present disclosure.

SUMMARY

It is to be understood that both the following general description and the following detailed description are exemplary and explanatory only and are not restrictive, as claimed. Disclosed are methods and systems for displaying content. In an aspect, a plurality of content items can be viewed on one display device from different viewing areas or locations. For example, a first content item can be viewed on a single display device from a first viewing area, range, angle, position, or location, while a second content item can be viewed on the same display device from a second viewing area, range, angle, position, or location. The second content item would not be viewable from the first viewing area and the first content item would not be viewable from the second viewing area. In another aspect, one or more sets of pixels can be positioned to enable a three-dimensional (3D) viewing experience for a content item.

In an aspect, an example method can comprise positioning a first set of pixels associated with a user device so that first content displayed via the first set of pixels can be viewable in a first viewing location. A second set of pixels associated with the user device can be positioned so that second content displayed via the second set of pixels is viewable in a second viewing location. The second content can be different from the first content. In an aspect, the first content is not viewable in the second viewing location and the second content is not viewable in the first viewing location.

In an aspect, an example method can comprise a user device receiving a first content item. The first content item can be displayed on a first set of pixels associated with a user device so that the first content item displayed on the first set of pixels is viewable in a first viewing location. The user device can receive a second content item. The second content item can be displayed on a second set of pixels associated with the user device so that the second content item displayed on the second set of pixels is viewable in a second viewing location. The first viewing location can be different from the second viewing location.

In another aspect, a location of a user can be determined. In an aspect, a set of pixels associated with a user device can be positioned so that an angle of the set of pixels changes relative to a front plane of the user device. The determined location can be within the viewing area of the set of pixels.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1 illustrates an exemplary content display according to an aspect of the system;

FIG. 2B illustrates an exemplary content display according to an aspect of the system;

FIG. 3A illustrates an exemplary content display according to an aspect of the system;

FIG. 3B illustrates an exemplary content display according to an aspect of the system;

FIG. 4A illustrates an exemplary content display according to an aspect of the system;

FIG. 4B illustrates an exemplary content display according to an aspect of the system;

FIG. 5A illustrates an exemplary content display according to an aspect of the system;

FIG. 5B illustrates an exemplary content display according to an aspect of the system;

DETAILED DESCRIPTION

Figure 2A:
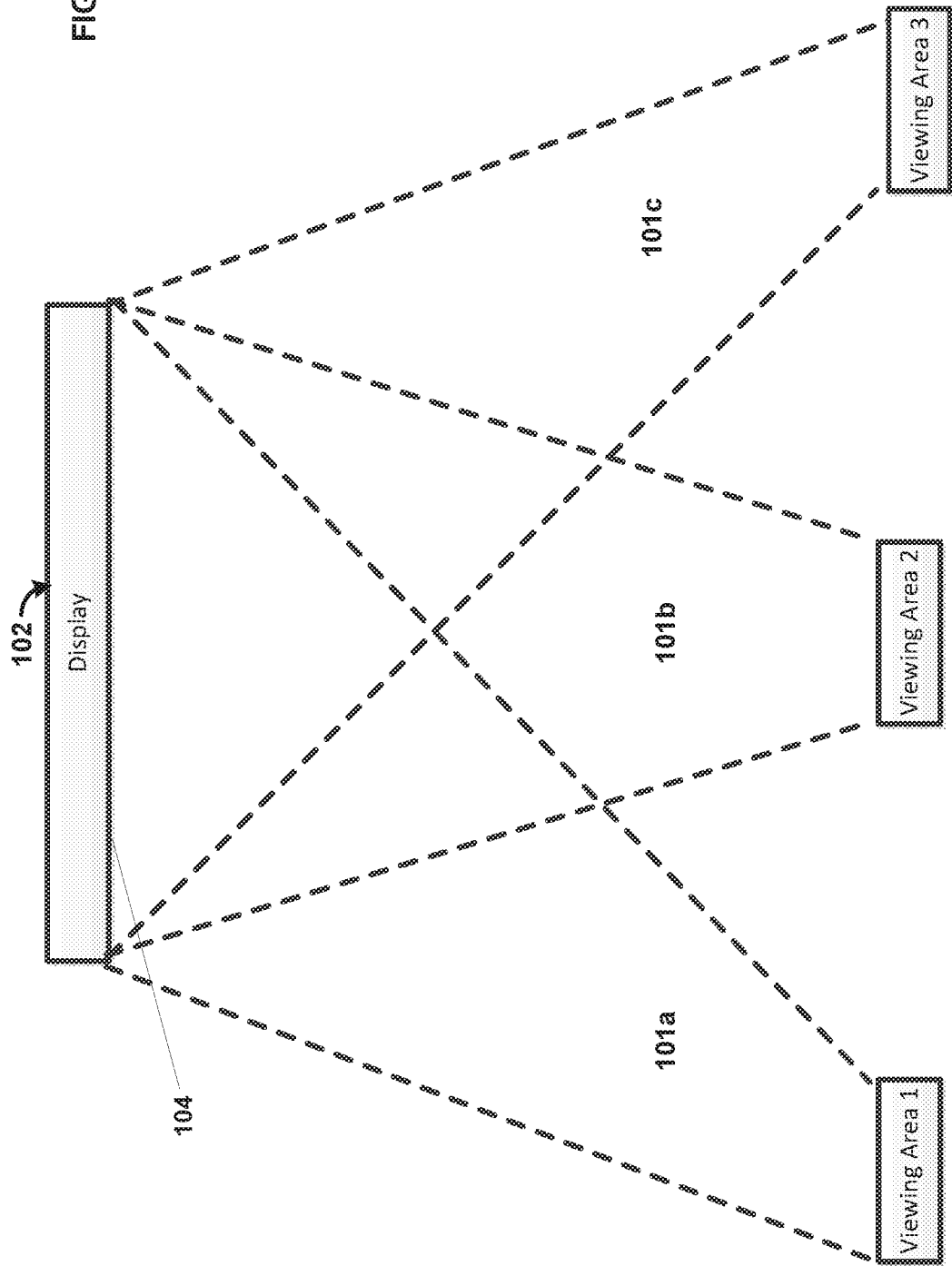
FIG. 2A illustrates an exemplary content display according to an aspect of the system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Disclosed are methods and systems for displaying content. In an aspect, a plurality of content items can be viewed on one display device at a plurality of viewing areas (e.g., locations, ranges, etc.). For example, a viewing area can comprise an angle and/or a position with respect to the display device. An example method can comprise positioning a first set of pixels associated with a user device so that first content displayed via the first set of pixels can be viewable in a first viewing area. A second set of pixels associated with the user device can be positioned so that second content displayed via the second set of pixels can be viewable in a second viewing area. In an aspect, the first content is not viewable in the second area and the second content is not viewable in the first area. In an aspect, the first viewing area and the second viewing area can be adjusted by positioning the respective first set of pixels and the second set of pixels. In another aspect, one or more sets of pixels (e.g., a first set of pixels, a second set of pixels) can be positioned to provide three dimensional viewing experiences. The disclosed methods can be applied to display devices such as LCD (e.g., TFT LCD, TN LCD) display devices, LED display devices, projected display devices, and the like. The disclosed methods and systems can provide personalized viewing for multiple users, privacy protection, and three dimensional viewing experiences.

FIG. 1 illustrates an exemplary content display. In an aspect, a plurality of (e.g., three) content items 101a, 101b, and 101c can be displayed on a user device 102. The viewing area (e.g., range, location, etc.) of a content item is the area of positions in front of the user device 102 where a user can be positioned and view the content item. The plurality of content items 101a, 101b, and 101c can be viewed by different viewers located in a plurality of viewing areas.

Each of the plurality of viewing areas can differ in position/angle relative to a front plane 104 of the user device 102. As an example, the user device 102 can comprise a television, a smartphone, a tablet, a laptop, a PDA, a computer, and the like. The user device 102 can employ any display technology such as a liquid-crystal display (LCD), a LED display device, a plasma display panel (PDP), a digital light processing (DLP) projector, and/or the like. In an aspect, a content item can be streamed or otherwise transferred to the user device 102, representing one or more of a television channel, a movie, a website, a radio station, a pay-per-view program, an on-demand program, a web series, a podcast, a webcast, an electronic book, a website, a blog, a social media site, and the like.

In an aspect, the third content item 101c can be different from the second content item 101b and the first content item 101a. For example, as shown in FIG. 1, the first content item 101a can comprise a movie, the second content item 101b can comprise the movie with a set of subtitles, and the third content item 101c can comprise a movie, an image, a website, a computer game, an electronic book, and the like, that is different from the first content item 101a and the second content item 101b. In an aspect, one or more audio tracks can be provided. The audio can be associated with one or more of the first content item 101a, the second content item 101b, and the third content item 101c. For example, the audio provided can be associated with the first content item 101a and the second content item 101b (e.g., the movie). In an aspect, different audio tracks for different content items can be presented through a personal listening device and/or an audio device (e.g., speakers) local to each user/viewing area. For example, audio device 105a can output audio accompanying the content item 101a; audio device 105b can output audio accompanying the content item 101b; and audio device 105c can output audio accompanying the content item 101c.

Turning briefly to FIGS. 2A and 2B, embodiments with three viewing areas (locations, ranges, etc.) and two viewing areas are illustrated, respectively. The systems and methods disclosed herein contemplate any number of viewing areas. FIG. 2A illustrates an embodiment with three viewing areas, wherein the content item 101a is angled to the left at Viewing Area 1, the content item 101b is directed forward to Viewing Area 2, and the content item 101c is angled to the right at Viewing Area 3. FIG. 2B illustrates an embodiment with two viewing areas, wherein the content item 101a is angled to the left at Viewing Area 1 and the content item 101b is angled to the right at Viewing Area 2. Turning back to FIG. 1, the viewer 103a, in Viewing Area 1 of FIG. 2A, can view the content item 101a, the viewer 103b, in Viewing Area 2 of FIG. 2A, can view the content item 101b, and the viewer 103c, in Viewing Area 3 of FIG. 2A, can view the content item 101c.

In an aspect, a viewing area can be defined by the maximum and minimum angles with respect to the user device 102 at which particular content can be viewed at a particular distance from the user device 102. As an example, a viewing area can comprise a viewing cone defined by a multitude of positions from which the content item associated with the viewing area can be viewed. In an aspect, the smaller the pixels, the more viewing areas are possible. The display device 102 can have a certain number of inputs (e.g., 3) and each of the certain number of inputs can be viewed via a respective viewing area. For example, a set top box connected to a display device via HDMI or other high speed data transfer medium that carries multiple transport streams can select a plurality of streams for simultaneous display, using the methods and devices described herein. In an aspect, at least a portion of the first viewing area associated with the first content item 101a and at least a portion of the second viewing area associated with the second content item 101b can be exclusive of each other. As such, only the first content item 101a can be viewed in the portion of the first viewing area and only the second content item 101b can be viewed in the portion of the second viewing area exclusive of each other. The first viewing area associated with the first content item 101a and the second viewing area associated with the second content item 101b can be of similar sizes or of different sizes. In an aspect, a barrier area can be the separation between viewing areas based on the viewing angles of the pixel sets. For example, the area in between the viewing cone for the first content item 101a and the viewing cone for the second content item 101b can be a barrier area. Similarly, the area in between the viewing cone for the second content item 101b and the viewing cone for content item 101c can be another barrier area. A barrier area can be a area at which neither content item with a viewing area adjacent to the barrier area can be viewed. The barrier area can be a space between different viewing areas (e.g., a first viewing area associated with the first content item 101a and a second viewing area associated with the first content item 101b). Size of pixels and/or distance between viewers and the display device can affect size of the barrier area. For example, the further away a viewer is from a display device, the larger the barrier area.

The viewing area can be determined by a point, such as a focal point or area of points, such as an area where one or more viewers are or are expected to be. In an aspect, one or more users, such as viewer 103a, can relay a location for a viewing area, such as Viewing Area 1 for content item 101a. Although Viewing Area 1, Viewing Area 2, and Viewing Area 3 in FIG. 2A and FIG. 2B are shown as having a smaller area than the display for simplicity, the actual viewing areas can be smaller, the same size, or larger than the display. In an aspect, relaying the location of a user can comprise tracking the location of the user via a motion sensor. In another aspect, relaying the location of a user can comprise performing facial recognition. For example, a face of the viewer 103a can be recognized and tracked as a reference for the viewing area of the content item 101a. For example, any type of motion sensor can be used to track the location of the user in terms of distance and/or angle with respect to the user device. As an example, a motion sensor can be installed in a user's headset or a remote control associated with the user. In an aspect, a viewer (e.g., the viewer 103a) can manually adjust the viewing area for a content item. For example, a viewer can adjust the viewing area for the content item through trial and error (e.g., cause a viewing area to adjust until the viewer can see the content item). After the location of a viewer (e.g., the viewer 103a) is relayed, the positions (e.g., mechanical angles) of a respective set of pixels can be adjusted accordingly. In the scenario of an LCD display, the pixels comprising a set of pixels associated with a content item can be rotated in unison with the use of a motor or a plurality of motors. Motors can be any size. For example, a screen at a stadium can use the methods and systems described herein to present different content to stadium goers in different sections. In an aspect, the systems and methods described for angling pixels can be accomplished by angling a light. For example, in the case of a scenario where a backlight projects outward, the light source producing the backlight can be rotated. In an aspect, the systems and methods described of angling pixels can be accomplished by angling a display. As such, when a viewer (e.g., the viewer 103a) views the display of the user device 102 from different angles, the light intensities and/or color emitted from the first set of pixels can be different from that of the second set of pixels and from that of the third set of pixels. As such, the first content, the second content and the third content can be presented to viewers (e.g., the viewer 103a, the viewer 103b, etc.) at respective viewing areas. In an aspect, the first content item 101a and second content item 101b are not viewable in the third viewing area and the third content item 101c is not viewable in the first or second viewing areas.

In an aspect, the user device 102 can comprise a plurality of pixel columns. Although pixel columns are illustrated in the figures pixel rows could also be used. Every $n^{th}$ column or row of pixels can correspond to a content item. In an aspect, the user device 102 can receive n content items. For instance, as shown in FIG. 3A, the user device 102 can display three content items, with the $1^{st}$, $4^{th}$, $7^{th}$, etc. columns or rows corresponding to the third content item 101c; the 2$^{nd}$, 5$^{th}$, 8$^{th}$, etc. columns or rows corresponding to the second content item 101b; and the 3$^{rd}$, 6$^{th}$, 9$^{th}$ etc. columns or rows corresponding to the first content item 101a. In an aspect, as shown in FIG. 3B, the user device can display two content items, with the 1$^{st}$, 3$^{rd}$, 5$^{th}$, etc. columns or rows corresponding to the second content item 101b; and the 2$^{nd}$, 4$^{th}$, 6$^{th}$, etc. columns or rows corresponding to the first content item 101a. In an aspect, each of the pixel columns or rows corresponding to a content item can display a vertical or horizontal sliver of the content item. In an aspect, when a viewer views the plurality of pixel columns or rows corresponding to the content item from a correct angle, the plurality of vertical or horizontal slivers can form the entire content item. Any number of pixel columns or rows is contemplated. Any number of content items is contemplated. In an aspect, the plurality of pixel columns or rows can be connected to each other by hinges.

Turning briefly to FIGS. 4A and 4B, an embodiment of a screen of the user device 102 is illustrated. FIGS. 4A and 4B illustrates an angled embodiment of the pixel columns of FIGS. 3A and 3B, respectively. As mentioned above, although the figures show pixel columns, pixel rows are also contemplated. In an aspect, the angled pixels can be behind a screen, wherein the screen remains constant as the pixels are angled. In an aspect, angling the pixels can comprise angling a screen and/or portions thereof. Such angling of the pixel columns or rows can be fixed (e.g., permanent) or adjustable. Turning back to FIG. 1, the pixel columns or rows corresponding to the content item 101a can be angled such that the viewing area of the content item 101a comprises a position left of center of the user device 102 and comprises the position of viewer 103a. For example, the pixel columns or rows corresponding to the content item 101b can be angled such that the viewing area of the content item 101b comprises a position in the center of the user device 102 and comprises the position of viewer 103b. For example, the pixel columns or rows corresponding to the content item 101c can be angled such that the viewing area of the content item 101c comprises a position right of center of the user device 102 and comprises the position of viewer 103c. In an aspect, each of the pixel columns or rows corresponding to a content item can display a vertical or horizontal sliver of the content item. In an aspect, when a viewer views the plurality of pixel columns or rows corresponding to the content item from a correct angle, the plurality of vertical or horizontal slivers can form the entire content item. Any number of pixel columns or rows is contemplated. Any number of content items is contemplated. In an aspect, the plurality of pixel columns or rows can be connected to each other by hinges. For example, each of the plurality of pixel columns or rows can be on a substrate and the substrates can be connected by mechanical hinges.

Turning to FIG. 5A, a top down perspective of exemplary re-angling of adjustable pixel columns is illustrated. As mentioned above, although the figures show pixel columns, pixel rows are also contemplated. In an aspect, pixel columns or rows 501a and 511a can display the content item 101a; pixel columns or rows 501b and 511b can display the content item 101b; and pixel columns or rows 501c and 511c can display the content item 101c. Such adjustments can be made manually or automatically through the use of one or more motors and the like. For example, a viewer can adjust the viewing area for the content item through trial and error (e.g., cause a viewing area to adjust until the viewer can see the content item). A first plurality of angles 504a and 508a of pixel columns or rows 501a, 511a relative to pixel columns or rows 501b, 511b can be a single angle or a plurality of angles at a first time. For example, the first plurality of angles 504a and 508a can be the same at the first time. For example, the first plurality of angles 504a and 508a can be different at the first time. The first plurality of angles 504b and 508b of pixel columns or rows 501a, 511a relative to pixel columns or rows 501b, 511b can be a single angle or a plurality of angles at a second time. For example, the first plurality of angles 504b and 508b can be the same at the second time. For example, the first plurality of angles 504b and 508b can be different at the second time. In an aspect, each of the angles associated with a particular content item (e.g., angles 504 and 508 are associated with the content item 101a) can change identically to each other. For example, if the difference between 504a and 504b is 4 degrees, then, in an aspect, the difference between 508a and 508b will also be 4 degrees. In such an embodiment, one or more motors can control the movement of all pixel columns or rows (e.g., 501b, 511b, etc.) displaying the content item 101a. In another embodiment, each of the angles associated with a particular content item (e.g., angles 504 and 508 are associated with the content item 101a) can change independently of each other. For example, if the difference between 504a and 504b is 4 degrees, then, in an aspect, the difference between 508a and 508b does not have to be 4 degrees. In such an embodiment, each of the pixel columns or rows 501a, 511a displaying the content item 101a can have a motor. A second plurality of angles 502a and 506a of pixel columns or rows 501c, 511c relative to pixel columns or rows 501b, 511b can be a single angle or a plurality of angles at the first time. For example, angles 502a and 506a can be the same at the first time. In another example, angles 502a and 506a can be different at the first time. The second plurality of angles 502a and 506a of pixel columns or rows 501c, 511c relative to pixel columns or rows 501b, 511b can be a single angle or a plurality of angles at a second time. For example, the first plurality of angles 502b and 506b can be the same at the second time. In another example, the first plurality of angles 502b and 506b can be different at the second time. In an aspect, each of the angles associated with a particular content item (e.g., angles 502 and 506 are associated with the content item 101c) can change identically to each other. For example, if the difference between 502a and 502b is 4 degrees, then, in an aspect, the difference between 506a and 506b will also be 4 degrees. In such an embodiment, one or more motors can control the movement of all pixel columns or rows (e.g., 501c, 511c, etc.) displaying the content item 101c. In another embodiment, each of the angles associated with a particular content item (e.g., angles 502 and 506 are associated with the content item 101c) can change independently of each other. For example, if the difference between 502a and 502b is 4 degrees, then, in an aspect, the difference between 506a and 506b does not have to be 4 degrees. In such an embodiment, each of the pixel columns or rows 501c, 511c displaying the content item 101c can have a motor.

Turning to FIG. 5B, a top down perspective of exemplary re-angling of adjustable pixel columns is illustrated. As mentioned above, although the figures show pixel columns, pixel rows are also contemplated. In an aspect, pixel columns or rows 501a and 511a can display the content item 101a; and pixel columns or rows 501b and 511b can display the content item 101b. Such adjustments can be made manually or automatically through the use of one or more motors and the like. For example, a viewer can adjust the viewing area for the content item through trial and error (e.g., cause a viewing area to adjust until the viewer can see the content item). A first plurality of angles 510a and 512a of pixel columns or rows 501*a*, 511*a* relative to pixel columns or rows 501*b*, 511*b* can be a single angle or a plurality of angles at a first time. For example, the first plurality of angles 510*a* and 512*a* can be the same at the first time. In another example, the first plurality of angles 510*a* and 512*a* can be different at the first time. The first plurality of angles 510*b* and 512*b* of pixel columns or rows 501*a*, 511*a* relative to pixel columns or rows 501*b*, 511*b* can be a single angle or a plurality of angles at a second time. For example, the first plurality of angles 510*b* and 512*b* can be the same at the second time. In another example, the first plurality of angles 510*b* and 512*b* can be different at the second time. In an aspect, each of the angles associated with a particular content item (e.g., angles 510 and 512 are associated with the content item 101*a*) can change identically to each other. For example, if the difference between 510*a* and 510*b* is 4 degrees, then, in an aspect, the difference between 512*a* and 512*b* will also be 4 degrees. In such an embodiment, one motor can control the movement of all pixel columns or rows (e.g. 501*a*, 511*a*, etc.) displaying the content item 101*a*. In another embodiment, each of the angles associated with a particular content item (e.g., angles 510 and 512 are associated with the content item 101*a*) can change independently of each other. In such an embodiment, each of the pixel columns or rows 501*a*, 511*a* displaying the content item 101*a* could have a motor.

In an aspect, a particular content item can be displayed by a set of pixels. The set of pixels can be a number of pixel columns and/or rows associated with the particular content item. As pixels become smaller in size, a greater number of pixels and a higher density of pixels can be implemented in the user device 102. Although FIGS. 1-5B show the user device 102 displaying two to three content items 101*a*, 101*b*, 101*c*, the actual number of content items displayed on a user device 102 is not so limited and can be any number allowable by the arrangement of pixels. In a further aspect, pixels can move independently of a pixel column or row, as will be explained in reference to FIG. 8 below.

Figure 6:
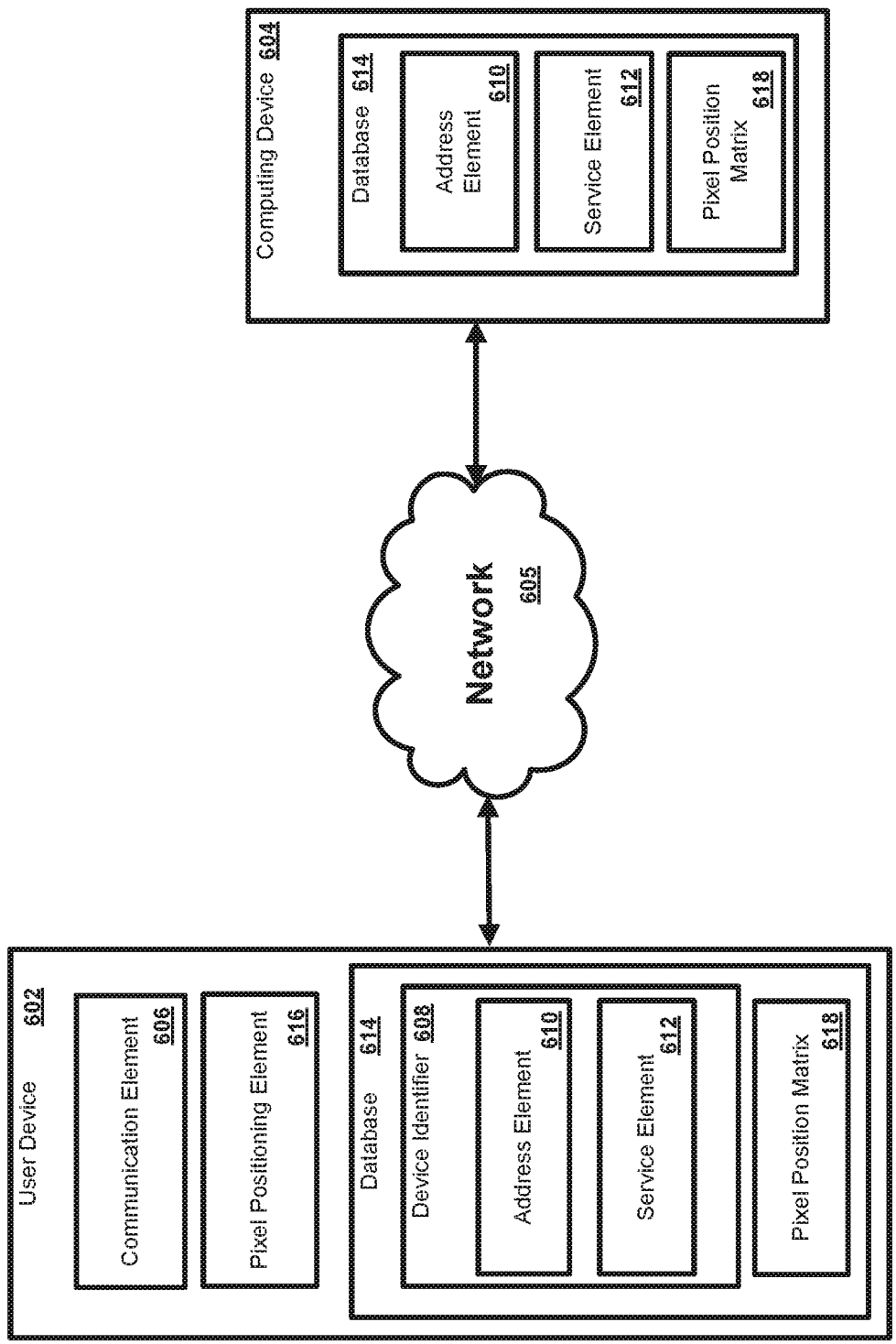
FIG. 6 illustrates various aspects of an exemplary system in which the present methods and systems can operate.

FIG. 6 illustrates various aspects of an exemplary environment in which the present methods and systems can operate. The present disclosure is relevant to systems and methods for providing services to a device, for example, a user device such as a computer, tablet, mobile device, communications terminal, or the like. In an aspect, one or more network devices can be configured to provide various services to one or more devices, such as devices located at or near a premises. Those skilled in the art will appreciate that present methods may be used in various types of networks and systems that employ both digital and analog equipment. One skilled in the art will appreciate that disclosed herein is a functional description and that the respective functions can be performed by software, hardware, or a combination of software and hardware.

The network and system can comprise a user device 602 in communication with a computing device 604 such as a server, for example. The computing device 604 can be disposed locally or remotely relative to the user device 602. As an example, the user device 602 and the computing device 604 can be in communication via a private and/or public network 605 such as the Internet or a local area network. Other forms of communications can be used such as wired and wireless telecommunication channels, for example.

In an aspect, the user device 602 can be an electronic device such as a computer, a smartphone, a laptop, a tablet, a display device, such as a liquid-crystal display (LCD), a LED display device, a plasma display panel (PDP), a digital light processing (DLP) projector, or other device capable of communicating with the computing device 604. As an example, the user device 602 can comprise a communication element 606 for providing an interface to a user to interact with the user device 602 and/or the computing device 604. The communication element 606 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to provide communication between the user and one or more of the user device 602 and the computing device 604. As an example, the communication element 606 can request or query various files from a local source and/or a remote source. As a further example, the communication element 606 can transmit data (e.g., requested content) to a local or remote device such as the computing device 604. As an example, the communication element 606 can be used to request one or more content item from the computing device 604. As another example, the communication element 606 can be used to receive a command from a user. For example, the command can comprise selecting particular content, adjusting one or more viewing areas, and/or viewing particular content from a specified viewing area.

In an aspect, the user device 602 can be associated with a user identifier or device identifier 608. As an example, the device identifier 608 can be any identifier, token, character, string, or the like, for differentiating one user or user device (e.g., user device 602) from another user or user device. In a further aspect, the device identifier 608 can identify a user or user device as belonging to a particular class of users or user devices. As a further example, the device identifier 608 can comprise information relating to the user device such as a manufacturer, a model or type of device, a service provider associated with the user device 602, a state of the user device 602, a locator, and/or a label or classifier. Other information can be represented by the device identifier 608. In an aspect, device identifier 608 can be transmitted when a request for a content item is transmitted from the user device 602 to the computing device 604. In another aspect, the computing device 604 can provide one or more content items to the user device 602 according to the device identifier 608 of the user device 602.

In an aspect, the device identifier 608 can comprise an address element 610 and a service element 612. In an aspect, the address element 610 can comprise or provide an internet protocol address, a network address, a media access control (MAC) address, an Internet address, or the like. As an example, the address element 610 can be relied upon to establish a communication session between the user device 602 and the computing device 604 or other devices and/or networks. As a further example, the address element 610 can be used as an identifier or locator of the user device 602. In an aspect, the address element 610 can be persistent for a particular network. In an aspect, address element 610 can be transmitted when a request for a content item is transmitted from the user device 602 to the computing device 604. In another aspect, the computing device 604 can provide one or more content items to the user device according to the address element 610) of the user device 602.

In an aspect, the service element 612 can comprise an identification of a service provider associated with the user device 602 and/or with the class of user device 602. The class of the user device 602 can be related to a type of device, capability of device, type of service being provided, and/or a level of service (e.g., business class, service tier, service package, customer status, etc.). As an example, the service element 612 can comprise information relating to or provided by a communication service provider (e.g., Internet service provider) that is providing or enabling data flow to the user device 602. As a further example, the service element 612 can comprise information relating to a preferred service provider for one or more particular services relating to the user device 602. As an example, the service element 612 can comprise preferred sporting event, preferred news channel, preferred music channel, and/or the like. In an aspect, the address element 610 can be used to identify or retrieve data from the service element 612, or vice versa. As a further example, one or more of the address element 610 and the service element 612 can be stored remotely from the user device 602 and retrieved by one or more devices such as the user device 602 and the computing device 604. Other information can be represented by the service element 612. For example, service element 612 can be associated with user profiles, user preferences, user viewing histories, and the like.

In an aspect, the user device 602 can be associated with a pixel positioning element 616. In an aspect, the pixel positioning element 616 can retrieve a corresponding pixel position matrix 618 associated with a specific viewing area. For example, the corresponding pixel position matrix 618 can be retrieved from the computing device 604 via the network 605. In another aspect, the pixel positioning element 616 can position a set of a particular set of pixels according to the retrieved pixel position matrix 618. The pixel position matrix 618 can comprise information that describes one or more angles at which one or more pixels/pixel columns/pixel rows should be positioned.

In an aspect, the computing device 604 can be a server for communicating with the user device 602. As an example, the computing device 604 can communicate with the user device 602 for providing data and/or services. As an example, the computing device 604 can provide services such as network (e.g., Internet) connectivity, network printing, media management (e.g., media server), content services, streaming services, broadband services, or other network-related services. In an aspect, the computing device 604 can allow the user device 602 to interact with remote resources such as data, devices, and files. As an example, the computing device 604 can be configured as (or disposed at) a central location (e.g., a headend, or processing facility), which can receive content (e.g., data, input programming) from multiple sources. As an example, the computing device 604 can comprise cable content providers, electronic book providers, internet service providers, digital video disk (DVD) players, camcorders, satellite receivers, cameras, digital video recorders (DVRs) and/or the like. In an aspect, the computing device 604 can combine the content from the multiple sources and can distribute the content to one or more user devices via a distribution system.

In an aspect, a database 614 can be integrated with the user device 602, the computing device 604, or some other device or system. As an example, the database 614 can store a plurality of files (e.g., web pages), user identifiers or records, or other information. As an example, the database 614 can store user profiles, user preferences, user viewing histories, and the like. As another example, one or more pixel position matrixes 618 and associated viewing areas can be stored in the database 614 as preset matrixes for the user device 602. In an aspect, the user device 602 can retrieve stored pixel position matrixes 618 in order to restore a previously arranged state of the pixels controlled by the pixel positioning element 606. In an aspect, the user device 602 can request and/or retrieve a file from the database 614. In an aspect, the database 614 can store information relating to the user device 602 such as the address element 610 and/or the service element 612. As an example, the computing device 604 can obtain the device identifier 608 from the user device 602 and retrieve information from the database 614 such as the address element 610 and/or the service elements 612. As a further example, the computing device 604 can obtain the address element 610 from the user device 602 and can retrieve the service element 612 from the database 614, or vice versa. Any information can be stored in and retrieved from the database 614. The database 614 can be disposed remotely from the user device 602 and/or the computing device 604 and accessed via direct or indirect connection.

In an aspect, the user device 602 can be associated with a plurality of computing devices 604. In an aspect, the user device 602 can access multiple tuners and/or devices (e.g., computing device 604) to receive the plurality of content items (e.g., channels, television programs, movies, etc.). As an example, the plurality of content items can be received from cable content providers, digital video disk (DVD) players, camcorders, satellite receivers, cameras, digital video recorders (DVRs), and/or the like. For example, the user device 602 can receive first content from a first computing device, and receive second content from a second computing device. The first content can be displayed via positioning a first set of pixels associated with a user device 602 so that the first content displayed on the first set of pixels can be viewable in a first viewing area. The second content can be displayed via positioning a second set of pixels associated with the user device 602 so that the second content displayed on the second set of pixels can be viewable in a second viewing area. In an aspect, the first set of pixels and the second set of pixels can be positioned so that the first content is not viewable in at least a portion of the second area and the second content is not viewable in at least a portion of the first area. In an aspect, the first content can be different from the second content.

Figure 7:
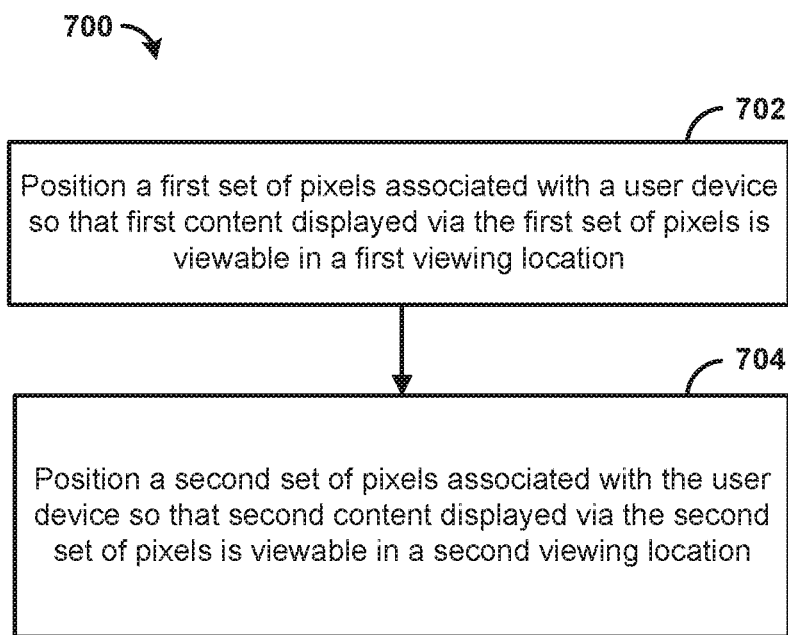
FIG. 7 is a flowchart illustrating an example method for displaying content.

FIG. 7 is a flowchart illustrating an example method 700 for displaying content. At step 702, a first set of pixels associated with a user device can be positioned so that first content displayed via the first set of pixels is viewable in a first viewing location (e.g., area). In an aspect, the first set of pixels is viewable utilizing the full viewable area of the user device. As an example, the user device can comprise a smartphone, a tablet, a laptop, a PDA, a computer, a liquid-crystal displays (LCD), a LED display device, a plasma display panel (PDP), a digital light processing (DLP) projector, and/or the like. In an aspect, the first content can comprise a media stream representing one or more of a television channel, a movie, a website, an advertisement, a radio station, a pay-per-view program, an on-demand program, a web series, a podcast, and a webcast. In another aspect, the first content can comprise an electronic book, a website, a blog, and a social media site, and the like. In an aspect, audio can be associated with the first content. In an aspect, a viewing location can be defined by the maximum and minimum angles with respect to the user device at which particular content can be viewed at a particular distance from the user device.

In an aspect, positioning the first set of pixels can comprise angling the first set of pixels so that the viewing location of the first set of pixels comprises the location of a viewer. In an aspect, the display of a user device can comprise a plurality of sets of pixels, wherein each set of pixels comprises a distinct content item. In an aspect, positioning the first set of pixels can comprise configuring a mechanical angle of one or more pixels of the first set of pixels. In an aspect, positions (e.g., mechanical angles) of the first set of pixels can be adjusted by a plurality of motors (e.g., nanomotors).

Figure 8:
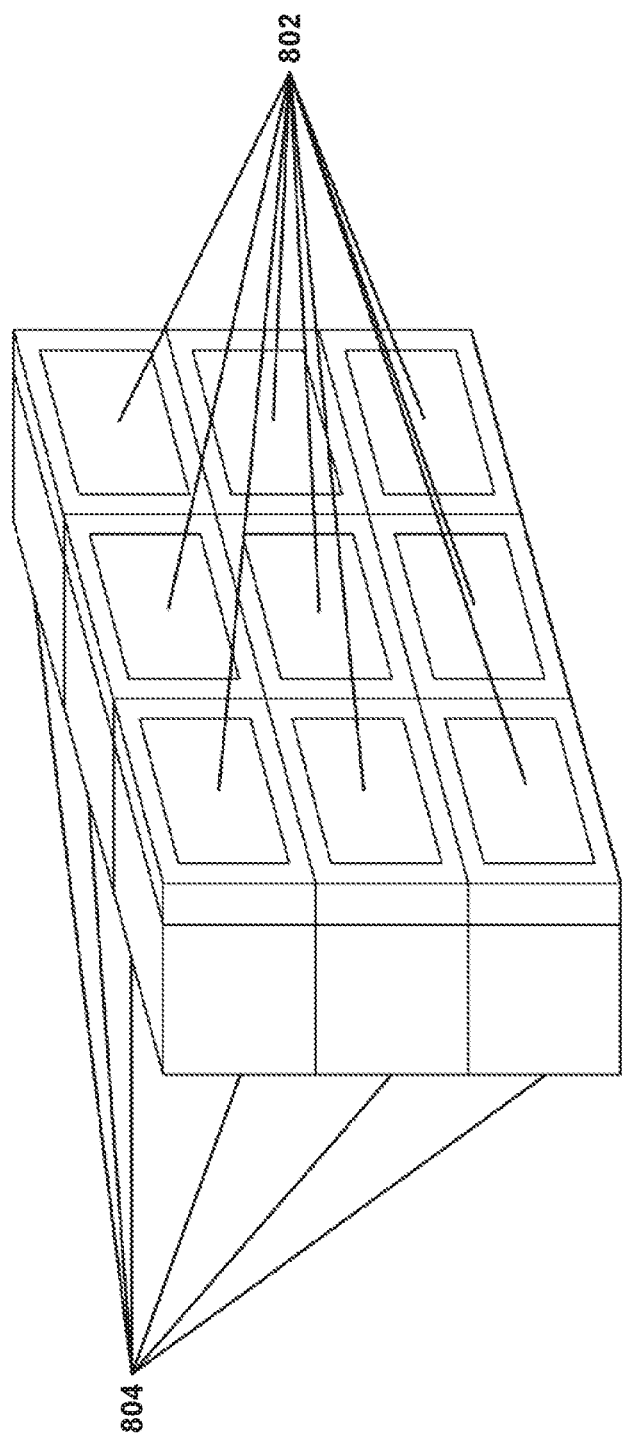
FIG. 8 illustrates an exemplary content display according to an aspect of the system.

An example hardware embodiment for positioning pixels is illustrated in FIG. 8. A plurality of pixels 802 and a plurality of motors 804 are illustrated, wherein each of the plurality of pixels is in communication with its own motor 804. Alternatively, each motor 804 can control a plurality of pixels, e.g., a plurality of pixels in a column or row. In an aspect, the plurality of motors 804 can allow the plurality of pixels 802 to have a wide range of motion. For instance, although FIGS. 1-5 describe viewing areas in terms of being left of center, center, or right of center, any spatial area can be used. For example, a first set of pixels 802 can be angled upwards to accommodate someone in the top bunk of a bunk bed and a second set of pixels 802 can be angled downwards to accommodate someone in the bottom bunk of a bunk bed. In another example, a first set of pixels 802 can be angled upwards to accommodate someone in the top bunk of a bunk bed, a second set of pixels 802 can be angled downwards and to the left to accommodate someone watching from a chair that is left of center, and a third set of pixels 802 can be angled downwards and to the right to accommodate someone watching from a chair that is right of center.

In an aspect, positions (e.g., mechanical angles) of the first set of pixels can be adjusted by a plurality of motors (e.g., nanomotors). In an aspect, size of motors can depend on size of pixels. Bigger pixels can use bigger scale motors and smaller pixels can use smaller scale motors. A motor can control (e.g., adjust) an individual pixel or a group of pixels. For example, a plurality of motors can be implemented behind a plurality of pixels. In an aspect, one of the plurality of motors can be implemented behind each of the plurality of pixels or otherwise a number of the plurality of pixels. For example, motors behind even columns or rows of pixels (e.g., a first set of pixels) can be adjusted to direct light toward a viewer of the left side of a display device. Motors behind odd columns or rows of pixels (e.g., a second set of pixels) can be adjusted to direct light toward the right side of the display device. As such, even columns or rows of pixels (e.g. a first set of pixels) can represent a first viewing location and odd columns or rows of pixels (e.g., a second set of pixels) can represent a second viewing location. A viewer on a viewing location (e.g., left side of a display device, right side of a display device) can only see light waves pointed in his direction. Light waves from even columns or rows of pixels and light waves from odd columns or rows of pixels can be independently controlled. Therefore, even columns or rows of pixels and odd columns or rows of pixels can operate as respective stand-alone display devices.

Turning back to FIG. 7, at step 704, a second set of pixels associated with the user device can be positioned so that second content displayed via the second set of pixels can be viewable in a second viewing location. Any of the techniques described above can be used to determine the second viewing location. In an aspect, positioning the second set of pixels can comprise configuring a mechanical angle of one or more pixels of the second set of pixels. In an aspect, positions (e.g., mechanical angles) of the second set of pixels can be adjusted by a plurality of motors (e.g., nanomotors). In an aspect, facial recognition can be used to distinguish between users and one or more viewing locations adjusted based on determined users/user positions. For example, a camera in communication with facial recognition software can be used to distinguish users. In another aspect, a camera in communication with feature recognition software can be used to distinguish where users are located and create one or more viewing locations such that the one or more viewing locations each include the corresponding users' eyes and/or heads. In yet another aspect, a user device, such as a remote control, a smart phone, and/or a tablet, can be used as an indication of a user's location. For example, using Bluetooth, GPS, radio frequency, and/or infrared technologies, the location of one or more user devices can be determined and/or approximated. In a further example, separate viewing locations can be associated with one or more user devices. In an aspect, the second set of pixels is viewable utilizing the full viewable area of the user device while the first set of pixels is also viewable utilizing the full viewable area of the user device, albeit from different viewing angles. In an aspect, the second content can comprise a media stream representing one or more of a television channel, a movie, a website, a radio station, an advertisement, a pay-per-view program, an on-demand program, a web series, a podcast, and a webcast. In another aspect, the second content can comprise an electronic book, a website, a blog, and a social media site, and the like. In an aspect, the second content can be different from the first content. For example, the first content can comprise a program (e.g., a movie) and the second content can comprise the program (e.g., the movie) with a set of subtitles. As another example, the first content can be displayed in a higher resolution (e.g., 4K), and the second content can be displayed in a lower resolution (e.g., 2K). As another example, the first content can be displayed in color, and the second content can be displayed in black and white. In an aspect, the first content is not viewable in the second viewing location and the second content is not viewable in the first viewing location. In an aspect, at least a portion of the first viewing location and at least a portion of the second viewing location can be exclusive of each other.

In an aspect, audio can be associated with the second content. The audio associated with the first content can be related to audio associated with the second content. As an example, the first content can be a movie, and the second content can be the movie with a set of subtitles. Both the first content and the second content can be associated with the same audio. In another aspect, at least one of the first content and the second content has no associated audio. For example, the first content can be a movie with associated audio, and the second content can comprise an electronic book without associated audio.

In an aspect, a third set of pixels associated with the user device can be positioned so that third content displayed on the third set of pixels can be viewable in a third viewing location. In an aspect, the third content can be different from the second content and from the first content. For example, the first content can comprise a program (e.g., a movie), the second content can comprise the program (e.g., the movie) with a set of subtitles, and the third content can comprise an image, a website, a computer game, an electronic book, and the like, that is different from the first content and the second content. In an aspect, the first and second content are not viewable in the third viewing location and the third content is not viewable in the first or second viewing locations. In an aspect, the first content, the second content, and the third content can each have associated audio that is provided to an output device associated with the viewable location associated with either the first content, the second content, or the third content.

In an aspect, positioning the third set of pixels can comprise adjusting mechanical angles of one or more pixels of the third set of pixels with respect to the user device. In an aspect, positions (e.g., mechanical angles) of the third set of pixels can be adjusted by a plurality of motors (e.g., nanomotors). In an aspect, each column or row of a set of pixels can be positioned at a same angle relative to a front of the user device 102. In an aspect, at least one column or row of a set of pixels can be at a different angle relative to a front of the user device 102 than at least one other column or row of the set of pixels.

Figure 9:
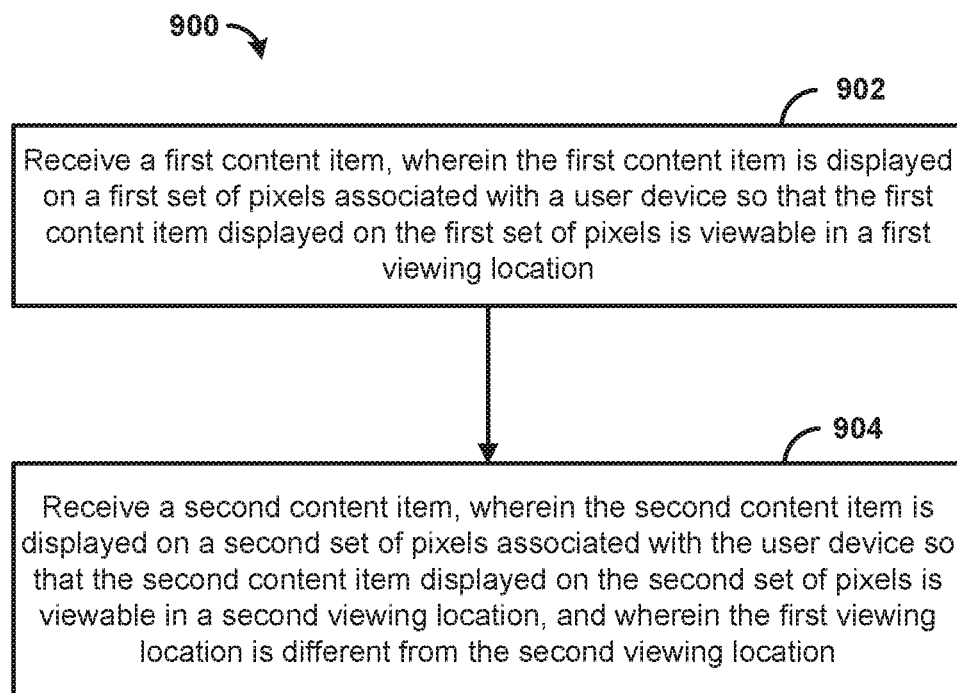
FIG. 9 is a flowchart illustrating another example method for displaying content.

FIG. 9 is a flowchart illustrating another example method 900 for displaying content. At step 902, a first content item can be received. As an example, the first content item can be received from one or more of, cable content providers, internet service providers, electronic books providers, digital video disk (DVD) players, camcorders, satellite receivers, cameras, digital video recorders (DVRs), and/or the like. The first content item can be displayed on a first set of pixels associated with a user device so that the first content item displayed on the first set of pixels can be viewable in a first viewing location. As an example, the user device can comprise a smartphone, a tablet, a laptop, a PDA, a computer, a liquid-crystal displays (LCD), a light-emitting diode (LED) display device, a plasma display panels (PDP), a digital light processing (DLP) projector, and/or the like. In an aspect, the first content item can comprise a media stream representing one or more of a television channel, a movie, a website, a radio station, a pay-per-view program, an on-demand program, a web series, a podcast, and a webcast. In another aspect, the first content item can comprise one or more of an electronic book, a website, a blog, and a social media site, and the like. In an aspect, audio can be associated with the first content item. In an aspect, a viewing location can be defined by the maximum and minimum angles with respect to the user device at which particular content item can be viewed at a particular distance from the user device.

At step 904, a second content item can be received. As an example, the second content item can be received from cable content providers, digital video disk (DVD) players, camcorders, satellite receivers, cameras, digital video recorders (DVRs), and/or the like. The second content item can be displayed on a second set of pixels associated with the user device so that the second content item displayed on the second set of pixels is viewable in a second viewing location. In an aspect, the first content item can be different from the second content item. For example, the first content item can comprise a program (e.g., a movie) and the second content item can comprise the program (e.g., the movie) with a set of subtitles. As another example, the first content item can be displayed in a higher resolution (e.g., 4K), and the second content item can be displayed in a lower resolution (e.g., 2K). As another example, the first content item can be displayed in color, and the second content item can be displayed in black and white. In an aspect, the first viewing location can be different from the second viewing location.

In an aspect, a third content item can be received. As an example, the third content item can be received from cable content providers, digital video disk (DVD) players, camcorders, satellite receivers, cameras, digital video recorders (DVRs), and/or the like. The third content item can be displayed on a third set of pixels associated with the user device so that the third content item displayed on the third set of pixels is viewable in a third viewing location. In an aspect, the third content item can be different from the second content item and from the first content item. For example, the first content item can comprise a program (e.g., a movie), the second content item can comprise the program (e.g., the movie) with a set of subtitles, and the third content item can comprise a website, a computer game, an electronic book, that is different from the first content item and the second content item. In an aspect, the first content item is not viewable in the second or third viewing locations, the second content item is not viewable in the first or third viewing locations, and the third content item is not viewable in the first or second viewing locations. In an aspect, at least a portion of each of the first viewing location, the second viewing location, and the third viewing location can be exclusive of each other. As such, only one content item can be viewed in at least a portion of each of the first viewing location, the second viewing location, and the third viewing location, exclusive of each other.

In an aspect, the audio associated with the first content item can be related to the audio associated with the second content item and/or the third content item. For example, the first content item can comprise a television program, the second content item can comprise the television program with a first set of subtitles (e.g., subtitles in English), and the third content item can comprise the television program with a second set of subtitles (e.g., subtitles in Spanish). The first content item, the second content item and the third content item can share the same audio. In an aspect, the first content item, the second content item, and the third content item can each have associated audio that is provided to an output device associated with the viewable location associated with the first content item, the second content item, or the third content item.

In an aspect, the first set of pixels can comprise a first set of columns or rows of pixels. In an aspect, the second set of pixels can comprise a second set of columns or rows of pixels. In an aspect, columns or rows of pixels of the user device 102 can alternate between a column or row from the first set of columns of pixels and a column or row from the second set of columns of pixels. In an aspect, each column or row of a set of pixels can be positioned at a same angle relative to a front of the user device 102. In an aspect, at least one column or row of a set of pixels can be at a different angle relative to a front of the user device 102 than at least one other column or row of the set of pixels.

Figure 10:
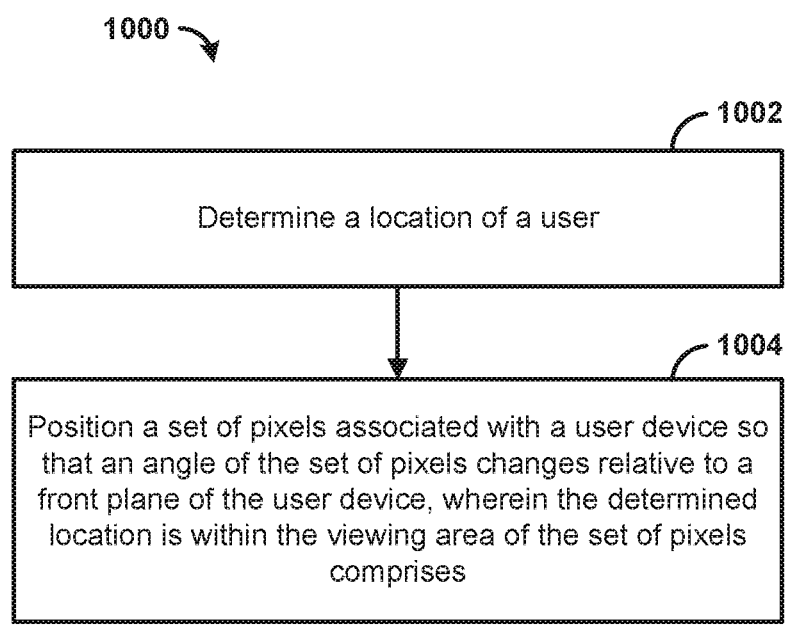
FIG. 10 is a flowchart illustrating another example method for displaying content.

FIG. 10 is a flowchart illustrating another example method 1000 for displaying content. At step 1002, a location of a user can be determined. In an aspect, determining the location of a user can comprise tracking the location of the user via a motion sensor. In another aspect, determining the location of the user can comprise performing facial recognition. For example, a face of the user can be recognized (e.g., via a camera or other sensor) and tracked as a reference for a viewing area. For example, any type of motion sensor can be used to track the location of the user in terms of distance and/or angle with respect to the user device. As an example, a motion sensor can be installed in a user's headset or a remote control associated with the user. In an aspect, determining the location of a user can comprise continually determining the user location, or tracking the user location. User location tracking can utilize, for example, an ultra sound motion sensor, an electronic motion senor, an infrared motion sensor, and the like, can be used to track the location of the user in terms of distance and angle with respect to the user device.

In an aspect, determining the location of the user can further comprise determining a left side of the user and determining a right side of the user. In an aspect, facial recognition can be used to determine a feature of the user that would indicate a middle of the user (e.g., a nose). In a further aspect, the area of the user from the middle to the right can be determined to be the right side of the user. In a further aspect, the area of the user from the middle to the left can be determined to be the left side of the user. In another aspect, facial recognition can be used to determine a set of features of the user used to view the content (e.g., a pair of eyes, a pair of glasses, etc.) In a further aspect, the facial recognition can determine a right side of the set of features used to view the content. In a further aspect, the facial recognition can determine a left side of the set of features used to view the content.

At step 1004, a set of pixels associated with a user device can be positioned so that an angle of the set of pixels changes relative to a front plane of the user device. In an aspect, the determined location can be within a viewing area of the set of pixels. In an aspect, the viewing area of the set of pixels can comprise the determined location of the user. In an aspect, mechanical angles of the set of pixels can be adjusted. For example, the mechanical angles of set of pixels can be adjusted via a set of motors associated with the set of pixels. In an aspect, motors can be actuated by microelectromechanical force generated by a local magnetic or electrical field.

Positioning the set of pixels associated with the user device can further comprise positioning a first portion of the set of pixels to direct light to the left side of the user. Positioning the set of pixels associated with the user device can further comprise positioning a second portion of the set of pixels to direct light to the right side of the user. In an aspect, the first portion of the set of pixels can be directed to the left eye of the user and the second portion of the set of pixels can be directed to a right eye of the user. In an aspect, light waves emitted from the set of pixels can form a three dimensional effect, as illustrated in FIG. 11.

Figure 11:
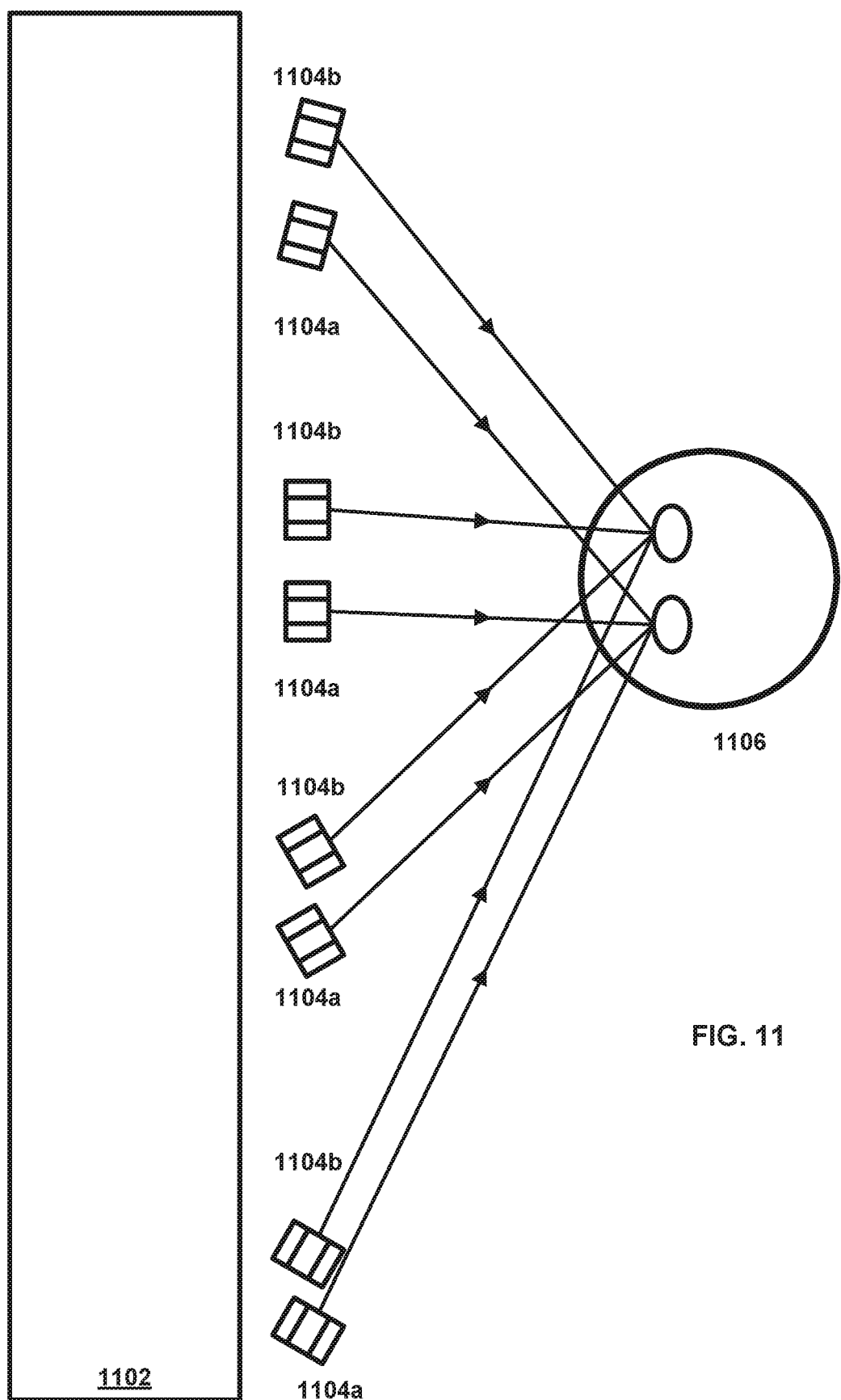
FIG. 11 illustrates an exemplary content display according to an aspect of the system.

Turning to FIG. 11, a viewer 1106 in front of a user device 1102. A first portion of a set of pixels 1104a can emit light waves at a first target, such as the viewer's left eye. A second portion of a set of pixels 1104b can emit light waves at a second target, such as the viewer's right eye. In an aspect, the focal point of the first portion of the set of pixels 1104a can be the left eye of a viewer 1106 and the focal point of the second portion of the set of pixels 1104b can be the right eye of the viewer 1106. In an aspect, light waves emitted from the portions of the set of pixels can form a three dimensional effect. In a further aspect, the content shown on the first portion of the set of pixels 1104a can be different images of the same content shown on the second portion of the set of pixels 1104b. In an aspect, the difference in images shown on the first portion of the set of pixels 1104a with the images on the second portion of the set of pixels 1104b can create a sense of depth (e.g., a stereoscopic image). In an aspect, the difference in images shown on the first portion of the set of pixels 1104a with the images on the second portion of the set of pixels 1104b can accommodate a weak eye.

The viewing area can change according to the location of the user. In an aspect, when the user changes his location (for example, moves from the left side of the user device to the right side of the user device), the position of the set of pixels can be adjusted such that the viewing area of the set of pixels comprises the new location of the user. As an example, a motion sensor can be installed in a user's headset or a remote control associated with the user. Any of the methods previously mentioned, such as motion detection and facial recognition can be used to detect movement of the user. In an aspect, the left side of the user can be updated as the location of the user changes. In an aspect, the right side of the user can be updated as the location of the user changes.

Figure 12:
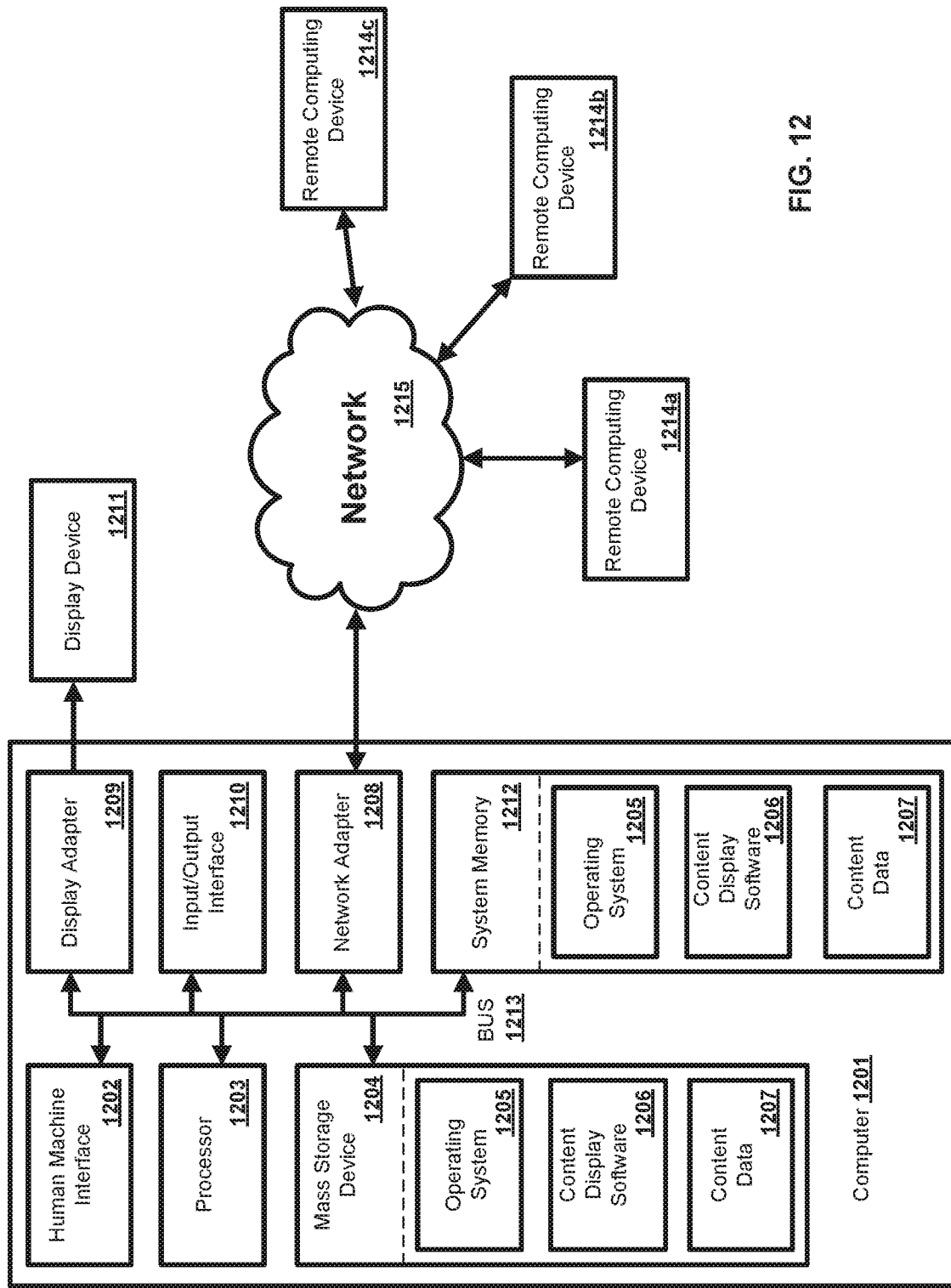
FIG. 12 is a block diagram illustrating an example computing device.

In an exemplary aspect, the methods and systems can be implemented on a computer 1201 as illustrated in FIG. 12 and described below. By way of example, user device 602 and computing device 604 of FIG. 6 can be a computer as illustrated in FIG. 12. Similarly, the methods and systems disclosed can utilize one or more computers to perform one or more functions in one or more locations. FIG. 12 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1201. The components of the computer 1201 can comprise, but are not limited to, one or more processors 1203, a system memory 1212, and a system bus 1213 that couples various system components including the processor 1203 to the system memory 1212. In the case of multiple processors 1203, the system can utilize parallel computing.

The system bus 1213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1213, and all buses specified in this description can also be implemented over a wired or wireless network connection and each of the subsystems, including the processor 1203, a mass storage device 1204, an operating system 1205, content display software 1206, content data 1207, a network adapter 1208, system memory 1212, an Input/Output Interface 1210, a display adapter 1209, a display device 1211, and a human machine interface 1202, can be contained within one or more remote computing devices 1214a,b,c at physically separate locations, connected through buses of this form, in effect implementing a fully distributed system.

The computer 1201 typically comprises a variety of computer readable media. Exemplary readable media can be any available media that is accessible by the computer 1201 and comprises, for example and not meant to be limiting, both volatile and non-volatile media, removable and non-removable media. The system memory 1212 comprises computer readable media in the form of volatile memory, such as random access memory (RAM), and/or non-volatile memory, such as read only memory (ROM). The system memory 1212 typically contains data such as content data 1207 and/or program modules such as operating system 1205 and content display software 1206 that are immediately accessible to and/or are presently operated on by the processor 1203.

In another aspect, the computer 1201 can also comprise other removable/non-removable, volatile/non-volatile computer storage media. By way of example, FIG. 12 illustrates a mass storage device 1204 which can provide non-volatile storage of computer code, computer readable instructions, data structures, program modules, and other data for the computer 1201. For example and not meant to be limiting, a mass storage device 1204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1204, including by way of example, an operating system 1205 and content display software 1206. Each of the operating system 1205 and content display software 1206 (or some combination thereof) can comprise elements of the programming and the content display software 1206. Content data 1207 can also be stored on the mass storage device 1204. Content data 1207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processor 1203 via a human machine interface 1202 that is coupled to the system bus 1213, but can be connected by other interface and bus structures, such as a parallel port, game port, an IEEE 1394 Port (also known as a Firewire port), a serial port, or a universal serial bus (USB).

In yet another aspect, a display device 1211 can also be connected to the system bus 1213 via an interface, such as a display adapter 1209. It is contemplated that the computer 1201 can have more than one display adapter 1209 and the computer 1201 can have more than one display device 1211. For example, a display device can be a monitor, an LCD (Liquid Crystal Display), or a projector. In addition to the display device 1211, other output peripheral devices can comprise components such as speakers (not shown) and a printer (not shown) which can be connected to the computer 1201 via Input/Output Interface 1210. Any step and/or result of the methods can be output in any form to an output device. Such output can be any form of visual representation, including, but not limited to, textual, graphical, animation, audio, tactile, and the like. The display 1211 and computer 1201 can be part of one device, or separate devices.

The computer 1201 can operate in a networked environment using logical connections to one or more remote computing devices 1214a,b,c. By way of example, a remote computing device can be a personal computer, portable computer, smartphone, a server, a router, a network computer, a peer device or other common network node, and so on. Logical connections between the computer 1201 and a remote computing device 1214a,b,c can be made via a network 1215, such as a local area network (LAN) and/or a general wide area network (WAN). Such network connections can be through a network adapter 1208. A network adapter 1208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1205 are illustrated herein as discrete blocks, although it is recognized that such programs and components reside at various times in different storage components of the computing device 1201, and are executed by the data processor(s) of the computer. An implementation of content display software 1206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
    determining a first viewing location associated with a user;
    positioning, based on the first viewing location, a set of adjustable pixels of a user device such that content displayed via the set of adjustable pixels is viewable at the first viewing location;
    determining a second viewing location associated with the user; and
    positioning, based on the second viewing location, the set of adjustable pixels of the user device such that the content displayed via the set of adjustable pixels is viewable at the second viewing location.

2. The method of claim 1, wherein determining the first viewing location further comprises:
    tracking a location of the user via a motion sensor or performing facial recognition, and wherein a portion of the first viewing location and a portion of the second viewing location are exclusive of each other.

3. The method of claim 1, wherein determining the second viewing location further comprises:
    tracking a location of the user via a motion sensor or performing facial recognition, and wherein a portion of the first viewing location and a portion of the second viewing location are exclusive of each other.

4. The method of claim 1, wherein positioning the set of adjustable pixels of the user device further comprises:
    positioning a first portion of the set of adjustable pixels to direct light to a left side of the user; and
    positioning a second portion of the set of adjustable pixels to direct light to a right side of the user.

5. The method of claim 1, wherein positioning the set of adjustable pixels of the user device further comprises:
    emitting light waves from the set of adjustable pixels to form a three dimensional effect.

6. The method of claim 1, wherein positioning the set of adjustable pixels of the user device further comprises:
    configuring a mechanical angle of one or more adjustable pixels of the set of adjustable pixels based on one or more of the first viewing location or the second viewing location.

7. An apparatus comprising:
    one or more processors; and
    a memory storing processor-executable instructions that, when executed by the one or more processors, cause the apparatus to:
    determine a first viewing location associated with a user;
    position, based on the first viewing location, a set of adjustable pixels of a user device such that content displayed via the set of adjustable pixels is viewable at the first viewing location;
    determine a second viewing location associated with the user; and
    position, based on the second viewing location, the set of adjustable pixels of the user device such that the content displayed via the set of adjustable pixels is viewable at the second viewing location.

8. The apparatus of claim 7, wherein the processor-executable instructions that cause the apparatus to determine the first viewing location further cause the apparatus to:
    track a location of the user via a motion sensor or performing facial recognition, and wherein a portion of the first viewing location and a portion of the second viewing location are exclusive of each other.

9. The apparatus of claim 7, wherein the processor-executable instructions that cause the apparatus to determine the second viewing location further cause the apparatus to:
    track a location of the user via a motion sensor or performing facial recognition, and wherein a portion of the first viewing location and a portion of the second viewing location are exclusive of each other.

10. The apparatus of claim 7, wherein the processor-executable instructions that cause the apparatus to position the set of adjustable pixels of the user device further cause the apparatus to:
    position a first portion of the set of adjustable pixels to direct light to a left side of the user; and
    position a second portion of the set of adjustable pixels to direct light to a right side of the user.

11. The apparatus of claim 7, wherein the processor-executable instructions that cause the apparatus to position the set of adjustable pixels of the user device further cause the apparatus to:
    emit light waves from the set of adjustable pixels to form a three dimensional effect.

12. The apparatus of claim 7, wherein the processor-executable instructions that cause the apparatus to position the set of adjustable pixels of the user device further cause the apparatus to:
    configure a mechanical angle of one or more adjustable pixels of the set of adjustable pixels based on one or more of the first viewing location or the second viewing location.

13. A method comprising:
    determining, a viewing location associated with a user;
    positioning, based on the viewing location, a set of adjustable pixels of a user device such that content displayed via the set of adjustable pixels is viewable at the viewing location;
    receiving a request to re-position the set of adjustable pixels of the user device; and
    re-positioning, based on the request, the set of adjustable pixels of the user device.

14. The method of claim 13, wherein determining the viewing location associated with the user comprises one or more of tracking a location of the user via a motion sensor or performing facial recognition.

15. The method of claim 13, wherein positioning the set of adjustable pixels further comprises:
configuring a mechanical angle of one or more adjustable pixels of the set of adjustable pixels based on the viewing location.

16. The method of claim 13, wherein re-positioning the set of adjustable pixels further comprises:
configuring a mechanical angle of one or more adjustable pixels of the set of adjustable pixels based on the request.

17. The method of claim 13, wherein re-positioning the set of adjustable pixels further comprises:
manually adjusting the set of adjustable pixels or automatically adjusting the set of adjustable pixels.

18. The method of claim 13, wherein the set of adjustable pixels comprises a set of rows and a set of columns, and wherein the set of columns of the set of adjustable pixels are positioned at a same angle relative to a front display of the user device.

19. An apparatus comprising:
one or more processors; and
a memory storing processor-executable instructions that, when executed by the one or more processors, cause the apparatus to:
determine, a viewing location associated with a user;
position, based on the viewing location, a set of adjustable pixels of a user device such that content displayed via the set of adjustable pixels is viewable at the viewing location;
receive a request to re-position the set of adjustable pixels of the user device; and
re-position, based on the request, the set of adjustable pixels of the user device.

20. The apparatus of claim 19, wherein the processor-executable instructions that cause the apparatus to determine the viewing location associated with the user comprises one or more of tracking a location of the user via a motion sensor or performing facial recognition.

21. The apparatus of claim 19, wherein the processor-executable instructions that cause the apparatus to position the set of adjustable pixels further cause the apparatus to:
configure a mechanical angle of one or more adjustable pixels of the set of adjustable pixels based on the viewing location.

22. The apparatus of claim 19, wherein the processor-executable instructions that cause the apparatus to re-position the set of adjustable pixels further cause the apparatus to:
configure a mechanical angle of one or more adjustable pixels of the set of adjustable pixels based on the request.

23. The apparatus of claim 19, wherein the processor-executable instructions that cause the apparatus to re-position the set of adjustable pixels further cause the apparatus to:
manually adjust the set of adjustable pixels or automatically adjust the set of adjustable pixels.

24. The apparatus of claim 19, wherein the set of adjustable pixels comprises a set of rows and a set of columns, and wherein the set of columns of the set of adjustable pixels are positioned at a same angle relative to a front display of the user device.

* * * * *